United States Patent [19]

Eichenberger

[11] Patent Number: 4,459,075
[45] Date of Patent: Jul. 10, 1984

[54] ROLL BALE LOADER

[75] Inventor: Jerry R. Eichenberger, Bismark, N. Dak.

[73] Assignee: Hoff Machine and Weld, Inc., Richardton, N. Dak.

[21] Appl. No.: 228,372

[22] Filed: Jan. 26, 1981

[51] Int. Cl.³ .................. A01D 37/12; B60P 1/48
[52] U.S. Cl. ............................ 414/24.5; 414/552; 414/553; 414/555
[58] Field of Search ............. 414/24.5, 24.6, 552, 414/553, 555, 111, 23, 550, 551, 567, 911

[56] References Cited

U.S. PATENT DOCUMENTS

| | | | |
|---|---|---|---|
| 2,772,007 | 11/1956 | Johnson | 414/552 |
| 3,253,716 | 5/1966 | Statton | 414/550 X |
| 3,800,966 | 4/1974 | Newton | 414/550 |
| 3,924,765 | 12/1975 | Hostetler | 214/518 |
| 3,952,881 | 4/1976 | Knudson | 414/44 X |
| 3,972,358 | 8/1976 | Kappler | 414/23 X |
| 4,015,737 | 4/1977 | Wright et al. | 214/501 |
| 4,023,690 | 5/1977 | Goode | 214/146 |
| 4,042,140 | 8/1977 | McFarland | 214/518 |
| 4,053,071 | 10/1977 | Schrag et al. | 214/506 |
| 4,062,457 | 12/1977 | McLean | 214/1 HH |
| 4,076,138 | 2/1978 | Honomichl, Sr. | 214/518 |
| 4,090,616 | 5/1978 | Runyan et al. | 214/1 HH |
| 4,099,629 | 7/1978 | Cox | 214/1 HH |
| 4,101,081 | 7/1978 | Ritter et al. | 414/24.5 |
| 4,117,940 | 10/1978 | Adam | 214/1 HH |
| 4,128,179 | 12/1978 | Gilbert | 214/1 HH |
| 4,329,101 | 5/1982 | Green et al. | 414/24.5 |
| 4,360,302 | 11/1982 | Askov et al. | 414/24.5 |
| 4,363,583 | 12/1982 | Bontrager | 414/555 X |

Primary Examiner—Robert J. Spar
Assistant Examiner—Janice Krizek
Attorney, Agent, or Firm—Kinney & Lange

[57] ABSTRACT

A loading device for the loading and ultimate transport of rolled bales. The unit is particularly designed for the loading of rolled bales onto a trailer unit such that the same may be transported from one location to another location. The bale loader is used for picking rolled bales from the ground, arranging them onto a transport trailer, moving the same upon the trailer to fully load the trailer and thereafter, after the destination is reached, deliver the bales from the trailer. The loading device includes a hydraulically aperated pivoting arm which will pick up individual bales and deposit and locate them so as to form pairs of bales in side-by-side relation upon a lower run of the trailer and deposit a third bale intermediately arranged upon the two lower bales such that three bales are arranged in a stacked relation upon the trailer. The trailer is provided with longitudinally extending and longitudinally driven chain members upon longitudinal support struts for the movement of the stacked bales rearwardly of the arm.

3 Claims, 4 Drawing Figures

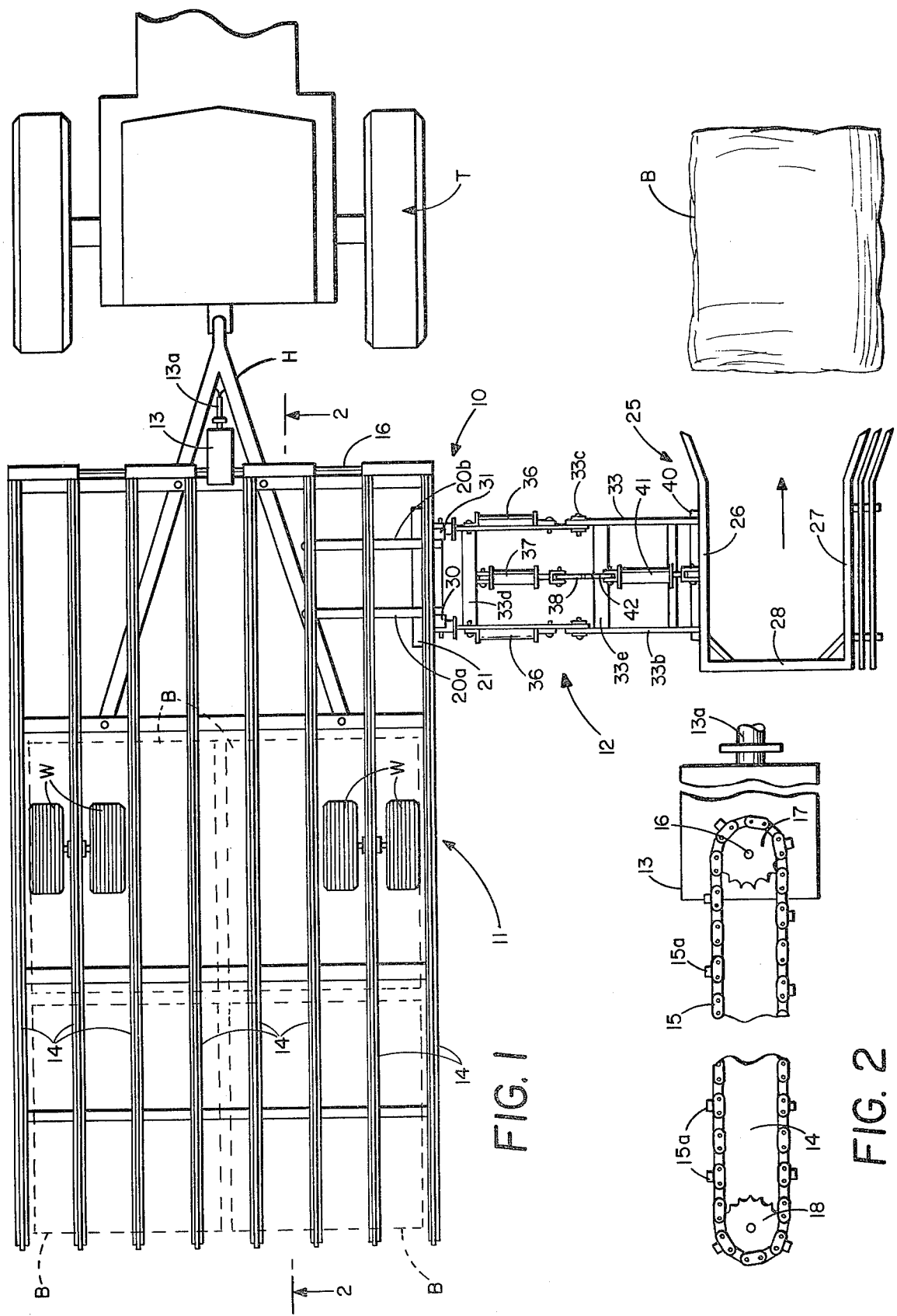

ROLL BALE LOADER

FIELD OF THE INVENTION

This invention relates generally to hay stack movers and more particularly to devices that are utilized in the moving of rolled bales of hay or other material from crop growing fields which are provided in rolled form as compared to stack moving devices.

SUMMARY DESCRIPTION OF THE INVENTION

This invention relates to a device arranged for the pickup, loading and transport of rolled bales from fields. The unit is provided with a bale gripping unit which is hydraulically controlled to initially lift the bale and elevate the same to a trailer unit. The elevation is accomplished by providing hydraulically controlled arm mechanisms which will position a first bale upon one side of the trailer, position another bale adjacent thereto and position a third bale intermediately upon the top of the two lower bales. The trailer device is provided with chain mechanisms for driving the loaded bales rearwardly of the unit so that a plurality of stacked bales are carried by the trailer upon transport.

The unloading of the trailer may simply include the reverse of the operation in which the hydraulically operated unit will unload the bales to the side of the trailer or the unit may simply continue its chain movement to discharge the bales from the rear of the trailer.

The lifting mechanism provides a means for gripping a rolled bale, elevating the same in inverted relationship to the initial gripping positioning arrangement of the same and upon such elevation and placement, release the bale upon the transport trailer.

BACKGROUND AND OBJECTS OF THE INVENTION

The concept of moving hay stacks is well known in the art. The original concept of such moving was related to the movement of longitudinally provided stacks wherein the stack was formed by stacking beds of hay upon one another and thereafter driving a loader under the stack and, through the use of teeth upon a longitudinal bed, move the stack onto the bed. Many units of operation have now advanced to rolled bales and these same units are totally impractical for lifting and transporting of such rolled units. The art therefore has progressed to various means for the loading and transport of rolled bales from the area of growth to the area of useage and a new art has developed to accomodate rolled bales.

The applicant has made a thorough search of the art with regard to devices that are capable of loading and transferring hay stacks in baled or pile form and the best art that the applicant was able to discover is as follows: Honomichl, Sr. U.S. Pat. No. 4,076,138; McFarland, U.S. Pat. No. 4,042,140; Cox, U.S. Pat. No. 4,099,629; Gilbert, U.S. Pat. No. 4,128,179; Runyan et al, U.S. Pat. No. 4,090,616; Goode, U.S. Pat. No. 4,023,690; Wright et al., U.S. Pat. No. 4,015,737; McLean U.S. Pat. No. 4,062,457; Schrag et al., U.S. Pat. No. 4,053,071; Hostetler, U.S. Pat. No. 3,924,765; and, Adam, U.S. Pat. No. 4,177,940.

Of all of these patents, it appears that only several of the same are directed in concept to the device that the applicant has provided. These would be the patents to Schrag et al, Hostetler and Honomichl, Sr. These are the only references that disclose the combination of loading and longitudinal movement of the loaded bales to provide room upon the trailer or tailing devices for the addition of further bales. These patents also provide a means for picking rolled bales from the ground for shifting onto the loading area with a device that may even be considered with the applicant's concepts.

Besides these three primary patents, the patent to Adam should be considered but this patent does not provide an inverting positioning device but rather provides a roll-off device which will not insure positive positioning upon the trailer and transport mechanism.

In all of this prior art, the units do not provide for a plurality of side-by-side loading situations and therefore, the amount of bales being moveable upon any one given operation is drastically limited in comparison to the device as provided by the applicant.

It is therefore an object of the applicant's invention to provide a device for the picking, loading and transport of rolled bales which includes the stacking of a plurality of rolled bales in side-by-side relation upon a trailer unit.

It is a further object of the applicant's invention to provide a device for the picking up, loading and transport of rolled bales which includes the positioning of a plurality of bales onto a trailer assembly with the trailer being provided with longitudinally moveable driving members for shifting the loading bales rearwardly along the trailer assembly such that a plurality of bales may be positioned upon and carried by the trailer assembly.

It is a further object of the applicant's invention to provide a hydraulically actuated, bale gripping and lifting mechanism for the pickup of rolled bales from ground level and transfer thereof to a trailer, transport assembly and whereby the loading assembly may be utilized for the unloading of the bales from the trailer or the bales may be deposited from the end of the trailer by utilizing the longitudinal drive mechanism.

These and other objects and advantages of the applicant's invention will more fully appear from a consideration of the accompanying description made in conjunction with the accompanying drawings.

BRIEF DESCRIPTION OF THE DRAWINGS

The following is a brief description of the drawings used in conjunction with the description of a preferred embodiment of the invention and in which the same numeral or indicia is utilized to indicate the same or similar parts throughout the several views, and in which:

FIG. 1 is a top plan view of the roll bale loader and trailer assembly therefore, illustrating the same in position to pick up and grasp a rolled bale from the ground;

FIG. 2 is vertical section taken substantially along Line 2—2 of FIG. 1 and illustrating the chain travel configuration of the trailer portion of the unit;

Figure 3:
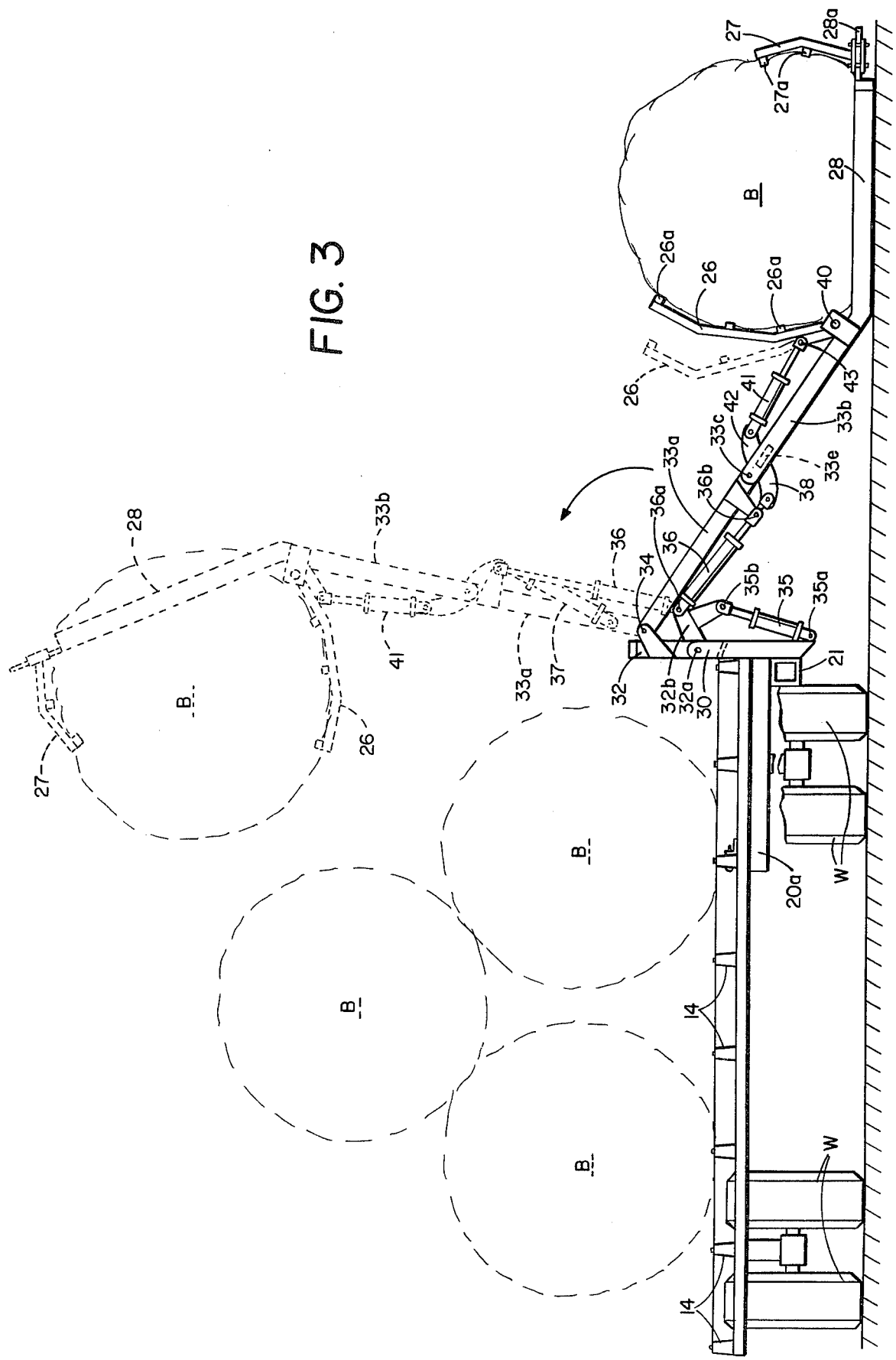
FIG. 3 is a rear elevational view of the unit and illustrating the initial grasping of the rolled bale from the ground and its elevational sequence to a position above the trailer unit; and, FIG. 4 is a continuing sequential view following that of FIG. 3 to illustrate the dropping and positioning of the bale upon the trailer unit.

In accordance with the accompanying drawings, the applicant's entire unit, embodying the rolled bale lifter and placement device and the transporting trailer unit is generally designated 10. The entire unit is designed to be transported across a field by a powered vehicle such as a tractor T and various power requirements for operational functions of the unit 10 are delivered from the tractor through power takeoff means or through the utilization of hydraulic pump means which are driven through the tractor T mechanisms. This arrangement is well known in the art and it is not thought necessary to describe such tractor or auxiliary equipment.

The basic concept of the applicant's invention is to provide a rolled bale loading and transport device and therefore it is necessary to provide a unit which is capable of picking rolled bales from the ground and elevating them to the level of the transporting vehicle, such as a provided trailer assembly, designated 11. The entire unit, including the trailer assembly 11 and the pickup unit 12 is arranged for towing across a field by the tractor T and therefore may be provided with a towing bar H and sets of wheels W. A first transmission unit 13 may be provided on the trailer assembly 11 with interconnection being made therebetween with a shaft element 13a. Other means for hydraulically connecting the pickup device to the tractor pump mechanism must obviously be provided through hydraulic fittings and lines.

As illustrated, the trailer assembly 11 includes a support structure carried upon the wheel units W and towing bar H, and this support structure includes a plurality of longitudinally extending support beams 14 carried upon various framework units of the structure. A typical cross section of such a beam 14 is illustrated in FIG. 2. As illustrated therein, the beam 14 is provided with a chain 15 upon the upper and lower surface thereof with a plurality of bale gripping teeth 15a on the exterior surface thereof. Chain 15 is connected to the power takeoff unit 13 through a transversely extending shaft 16 which is provided with drive gears 17 for driving of the chain units 15. An idler sprocket 18 is provided on the rearmost portion of the chain unit 15 and the beam 14 provides support for the drive gears 17 and the idler units and sprockets 18.

The concept of the trailer unit, the beams 14 and chain 15 mechanism with the teeth 15a thereon is to move the rolled bales from the forwardmost to an intermediate and thereafter to a rearmost position. Obviously the steps in movement rearwardly will depend upon the length of the trailer unit 11 such that at least three stacked bales may be positioned longitudinally thereon.

In the form shown the lifting structure 12 is rigidly mounted to the beam unit 14 by at least a pair of transversely extending frame members 20a, 20b supporting a cross frame mounting member 21. The members 20a, 20b have clips on them which attach to beams 14.

The bale lifting arrangement provides a fork unit generally designated 25 which incorporates a generally U-Shaped member providing an inner fork element 26 and a formed fork element 27 internally thereof. These elements are joined by a connector frame 28. The exterior fork element 27 is fixed to frame 28, while the interior fork element 26 is pivotally mounted to a portion of frame 28 and is controlled with a double acting hydraulic cylinder 41, which is operable with a suitable valve to pivot the interior fork to an open position, sufficiently spaced from the fixed fork element 27 so that the fork elements can be moved on opposite sides of a rolled bale which is resting on the ground. Inner fork member 26 is pivoted with a cylinder 41, after the bale is positioned, to squeeze the bale and grip it for lifting.

The bale loading unit includes a pair of vertical supports 30,31 which are fixed to the cross member 21, and which are positioned alongside the frame of the trailer. The supports 30,31 in turn support an articulated arm assembly 33, which in turn supports the fork member frame 28. A first support frame 32 forming a part of the articulated arm assembly 33 has a pair of side leg members joined together with a cross member and suitably braced. The first support frame is pivotally mounted as at 32a to the vertical supports 30, 31. The pivot axis at 32a is generally horizontal, and the position of the first support frame 32 about the pivot axis 32a is controlled by a pair of double acting hydraulic cylinders 35, one mounted on the lower end of each of the vertical supports 30, 31 as at 35a and having their respective rod ends connected as at 35b to arm 32b which are fixed to and are part of the first support frame 32. The arms 32b provide a lever arm for controlling movement of the first frame assembly.

The articulated arm assembly 33 further includes two additional sections, comprising an inner arm section 33a and an outer arm section 33b. The inner arm section 33a has two parallel side frame members which are held together with a cross member 33d at the base end. The base ends of the two side frame members of the inner section 33a are pivotally mounted as at 34 to provided lugs on the first support frame 32. The inner arm section 33a of the articulated arm assembly 33 is controlled for movement about its pivotal mounting 34 with a pair of double acting hydraulic cylinders 36 connected to arms 32b as at 36a and also connected to ears fixed to the side frame members of the upper section 33a as at 36b. Note that the cylinders 36 have their base ends connected to the arms 32b, and of course when the first frame section is pivoted about pivot axis 32a, the arm sections 33a and 33b will move, as will the cylinders 36, with the first frame so that the angular orientation of the inner arm section 33a about the pivot 34 does not change when the frame 32 is pivoted about its axis.

The outer arm section 33b has two side frame members which are fixed together with a cross member 33e adjacent the pivot axis 33c. The pivot axis 33c is the axis of pivoting of the two side arm members of the outer arm section 33b to the side members of the inner arm section 33a. The pivot axes 33c, 34 and 32a are all parallel horizontal axes as shown.

The cross member 33e supports a first lever arm 38 which is fixed to the cross member and extends downwardly below the cross member as seen in FIG. 3 and angles back toward the inner arm section 33a. A hydraulic cylinder 37 has its base end mounted to the cross member 33d of inner arm section 33a, and has its rod end connected to the end of the lever 38. Cylinder 37 is also a double acting cylinder, and upon extension and retraction of the cylinder 37 (there is only one cylinder in position between the sides of the inner arm section 33a) the outer arm section 33b will be caused to pivot about the pivot 33c. As can be seen the outer arm section 33b supports the frame 28 on which the fork members are mounted.

The inner fork member or grip member 26 is pivotally mounted as at 40 on pins connected to suitable ears mounted at the outer end of the arms of the outer arm section 33b. The pivoted position of the fork member 26 is controlled by a hydraulic cylinder 41 which has its base end mounted to a lever arm 42, also mounted on the cross member 33e, but above the cross member as seen in FIG. 3. The rod end of the double acting hydraulic cylinder 41 is connected as at 43 to a suitable bracket which is fixed to the inner fork member 26, and extension and retraction of the cylinder 41 will control the pivotal movement of the fork member 26.

The fork member 27 can be suitably mounted on supports 28a connected to the frame 28, and can be adjustably clamped in position on the supports 28a.

The cylinders 35 are connected in parallel so that they act together, but have a separate valve for control. The cylinders 36, the single cylinder 37 and the cylinder 41 are also controllable independently. Because each can be independently operated, the movement of the articulated arm assembly can be quite closely controlled.

When bales B are to be loaded, the trailer or other vehicle on which the bale loader is mounted is moved, as with the tractor T, and the fork 26 would be generally in a dotted line position as shown in FIG. 3 with the cylinder 41 retracted. The fork is then moved to position so that the bale slides between the fork members 26 and 27. It can be seen that the leading ends of the fork members 26 and 27 are tapered to aid in guiding the bale into position between the fork members.

Once the bale is positioned as shown in FIG. 3, cylinder 41 will be actuated to pivot the fork member 26 to squeeze the bale against the fork member 27. The bale can be gripped very tightly, so that it will not slip or move. The loading process then can be accomplished to a first step generally as shown in FIG. 3 in dotted lines. This is done by actuating the cylinders 36, and pivoting the inner and outer arm sections 33a and 33b as a unit about the axis 34 so that the bale member is overhead, and overlying the vehicle or trailer that is shown.

Figure 4:
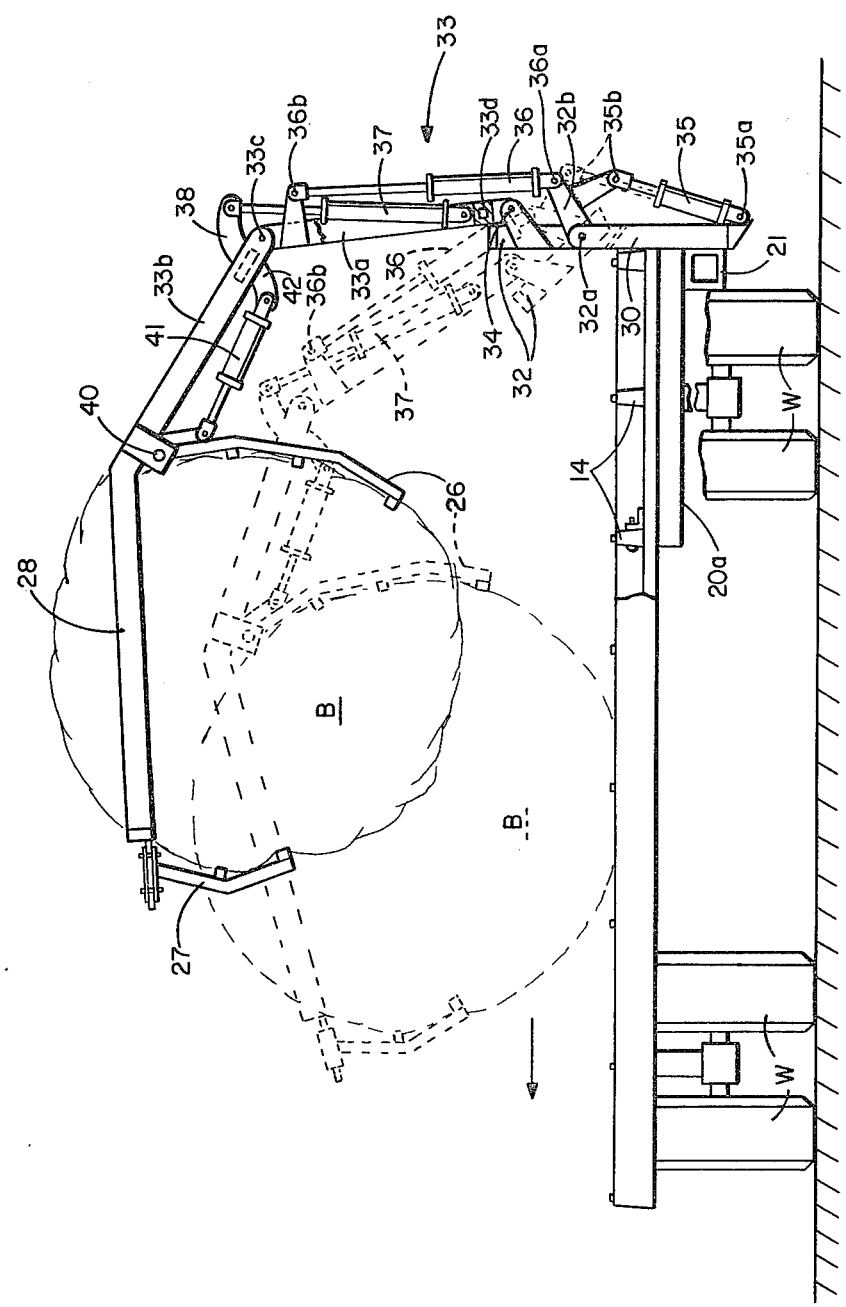

In FIG. 4 a further view in solid lines of the bale loader arms is illustrated, and in this case, outer arm section 33b has been pivoted about the pivot axis 33c by operating the cylinder 37, to tend to lower the bale toward the trailer bed. Additionally, the cylinder 35 can be actuated to tilt the first support frame 32 (along with arm sections 33a and 33b) about the pivot axis 32a and extend the bale loader arm substantially across the width of the trailer generally to the dotted line position. The bale loader arms are made so that they will extend generally farther across the trailer, so that the first bale can be placed adjacent the left hand edge of the trailer as seen in FIG. 4. This is accomplished by retracting the cylinder 37 somewhat from the position shown in FIG. 4 so that the fork member 26 moves the bale over. The arms would be designed to provide the reach necessary for the particular trailer or vehicle being utilized.

Then the bale squeeze or holding cylinder 41 can be retracted to open the fork member 26 to release the bale once it is in position on the trailer, and the operation can be reversed to again place the arm sections in their position as shown in FIG. 3 ready for picking up another rolled bale.

In loading, as shown in FIG. 3, generally two of the large bales are placed side by side in alignment with the arms at the front of the trailer, and a third bale is placed between the two generally as shown in dotted lines in this figure.

With a chain type stack mover being utilized as a trailer, or some other type of moving floor on the trailer, these first three bales can then be moved rearwardly on the trailer and three more bales loaded into position. The entire bed of the trailer can be used for hauling the bales. It should also be noted that the fork members 26 and 27 which grip the bales or squeeze the bales for lifting, have longitudinally extending members 26a and 27a, joined between upright members and are of sufficient size so that they will adequately grip the bale to allow the lifting and overhead holding thereof as shown in FIG. 4.

For unloading, generally, the bales will merely be moved off the trailer with the normal movable floor of the trailer, or even slid off by tilting and dumping the trailer. The bales can be manipulated with the bale loader assembly by reversing the operation of loading, if desired. That is, the bales may be individually picked up from the trailer and deposited on the ground or onto a hay bunk if desired.

It is to be understood that the articulated arm assembly can be mounted in different ways, and even can be made so that it would rotate for swinging the bales about an upright axis from one position to another. The arm is articulated into individual sections including the first frame section 32 and the inner and outer arm sections 33a and 33b, as shown and provides for adequate strength for loading, and sufficiently articulated members so that the bales can be placed in the positions desired across the width of the trailer. Also, adequate height is provided for stacking the center bale on top of the two lower bales as shown.

The fork or bale lifter can be modified by making the fork portion 26 fixed, and by having a telescoping frame supporting fork portion 27. A hydraulic cylinder may be used to pull portion 27 against the bale to squeeze the bale for handling.

What I claim is:

1. A loader for loading rolled bales of hay or similar crop material including:

a mobile bed having first and second longitudinally extending, spaced apart sides with the bed positioned between said sides, the longitudinally extending sides extending in direction of movement of the mobile bed;

a support frame pivotally attached to the mobile bed about a main mounting pivot axis extending generally longitudinally and horizontally and being located above the mobile bed adjacent a first side of the mobile bed, the support frame defining a support frame plane parallel to the main mounting pivot axis;

an arm assembly having at least first and second arm sections, said first arm section having one end pivotally mounted to said support frame about a first generally horizontal arm pivot axis positioned parallel to the main mounting axis;

said second arm section being pivotally mounted to a second end of said first arm section about a second generally horizontal arm pivot axis;

means at an outer end of the second arm section for receiving and retaining a rolled bale thereon comprising a "U" shaped bale squeeze fork having spaced apart side walls extending in longitudinal direction and being supported together with a cross member at the ends of the walls which are trailing relative to the direction of movement to form a forwardly opening bale squeeze fork of a size to receive a bale to be loaded;

a first hydraulic cylinder mounted to the support frame and to the first arm section to control pivotal movement of the first arm section;

a second hydraulic cylinder mounted between the first arm section and the second arm section to control pivotal movement of the second arm section about the second arm axis;

said first hydraulic cylinder being connected operably to pivot the first arm section in a first rotational direction from a first position wherein with the second arm section also in a working position the means for receiving a bale is adjacent the ground and in position to receive a bale resting on the ground outwardly from the first side of the mobile bed, to a second position with the first arm section extending substantially vertically when the support frame plane is substantially vertical;

said second hydraulic cylinder being connected to pivot the second arm section relative to the first arm section in the first rotational direction when the first arm section is in its second position so that the second arm section moves to a second pivotal position relative to the first arm with the means for retaining a bale positioned to overlie the mobile bed between the first and second sides of the mobile bed to position a bale supported thereby substantially inverted from the position of the bale when on the ground;

a third hydraulic cylinder for controlling movement of the support frame about the main mounting axis to move the support frame from a position with the support frame plane generally vertical in the same direction of pivoting as the arm sections so the support frame moves over portions of the mobile bed and extends toward the second side of the mobile bed, to thereby also move the arm sections toward the second side of the mobile bed when the arm sections are in their respective second positions;

the means to retain a bale including power means to move the walls of the bale receiving fork relative to each other to squeeze a bale between such walls; and the space between said walls of the receiving fork being substantially unobstructed, except for the cross member so that as the bale held is inverted over the mobile bed it will be released when the power means is actuated to separate the walls, the arm sections and support frame being mounted relative to the bed solely about generally horizontal pivot axes.

2. The apparatus as specified in claim 1 and an upright frame fixed to and extending upwardly from the mobile bed on the first side, said support frame being pivotally mounted about the main mounting axis adjacent the upper portions of said upright frame.

3. The apparatus of claim 1 wherein said means for receiving and retaining a rolled bale comprises a pair of generally upright wall members, said wall members of the bale retaining fork comprise an inner wall member and an outer wall member when the means for receiving and retaining are positioned adjacent the ground, one of said wall members being pivotally mounted to squeeze a bale against the other of the wall members under control of said power means, and means other than the pivoting of the one wall to permit adjusting the spacing of the other of the wall members relative to the one wall member.

* * * * *